United States Patent

[11] 3,539,173

[72] Inventor Carl J. Sampson
 Bellflower, California
[21] Appl. No. 731,541
[22] Filed May 23, 1968
[45] Patented Nov. 10, 1970
[73] Assignee Byron Jackson Inc.,
 Long Beach, California
 a corporation of Delaware

[54] BUMPER
 8 Claims, 5 Drawing Figs.
[52] U.S. Cl. .................................................. 267/140,
 61/48
[51] Int. Cl. .................................................. F16f 1/44
[50] Field of Search ......................................... 267/1(40),
 1(39), 1(41), 63; 61/48

[56] References Cited
UNITED STATES PATENTS
2,027,800 1/1936 Whitlock..................... 61/48
2,926,904 3/1960 Erlbacher.................... 267/1(40)

Primary Examiner—James B. Marbert
Attorneys—Donald W. Banner, Lyle S. Motley, C.G. Stallings and William S. McCurry ABSTRACT: A device for absorbing the impact between convergent and contiguous bodies due to relative movement therebetween, the device being attached to the surface of one of the bodies for resilient contact with the opposing body to cushion the blows of collision, dragging, or scuffing, and thus also alleviating damage to the bodies.

Patented Nov. 10, 1970
3,539,173
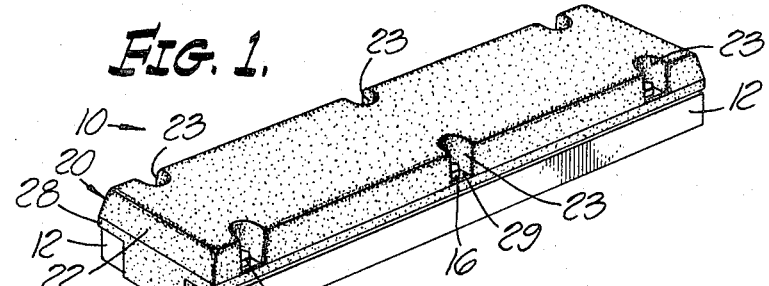
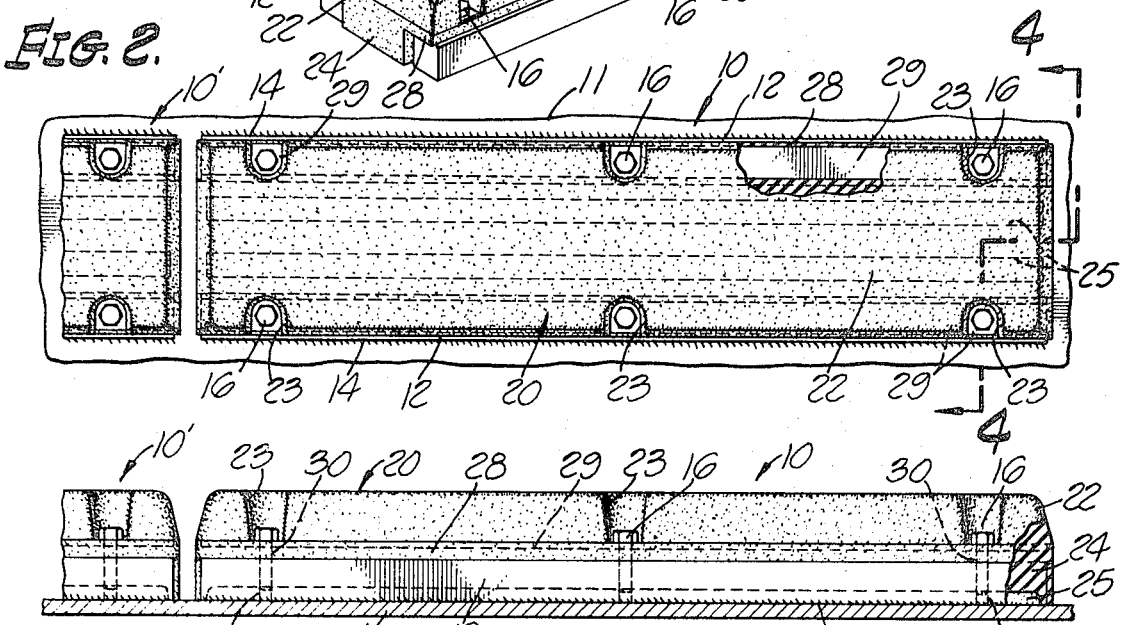
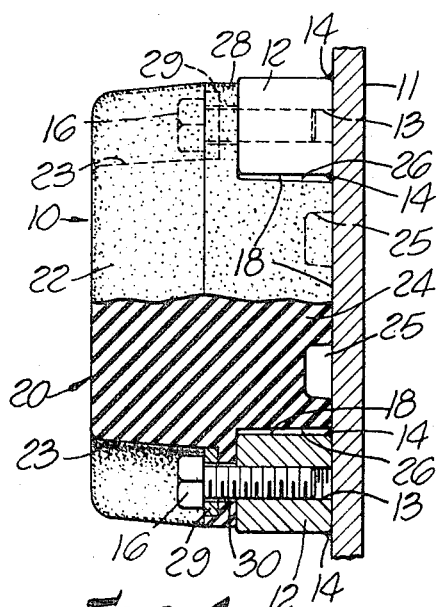
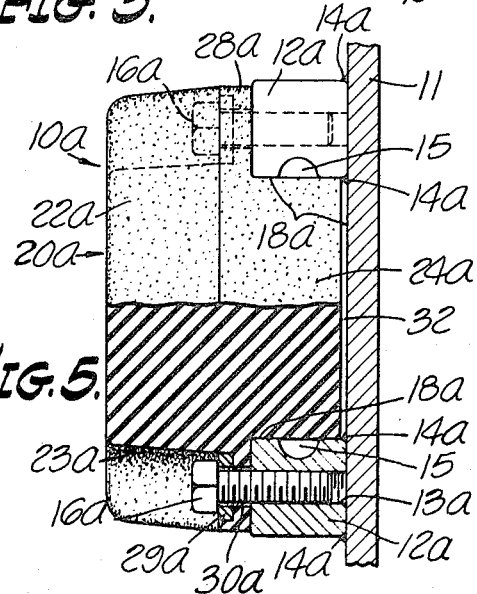
INVENTOR.
CARL J. SAMPSON
BY C. G. Stallings
ATTORNEY

BUMPER

BACKGROUND OF THE INVENTION

1. Field of the Invention

This invention relates to bumpers or bumper pads having elastomeric resilient means such as rubber, which are used to fend or prevent excessive shock on bumping, collision or contact of two bodies, such as between a truck and a loading dock, a boat and a pier or wharf, a towboat and a barge, or other moving or converging bodies, the bumpers being attached to one of the bodies, or both of them may be equipped with bumpers. The invention relates more particularly to bumpers or fenders used on towboats or tugboats as when pushing barges, where the relative motion on contact may be lateral or vertical because of wave motion, the forces and pressures on contact often being quite severe.

2. Description of the Prior Art

Bumpers of the general type described above are extant in the prior art, such as that disclosed in U.S. Pat. No. 2,926,904 issued Mar. 1, 1960 to R. W. Erlbacher. The primary deficiency of bumpers of the prior art is inefficient use of the resiliency of the elastomeric material or rubber in the bumper pad. Rubber, being essentially incompressible, must depend for its elasticity on being able to be displaced or to deform or flow when force is applied to it; and then, due to its inherent characteristic elasticity, it is biased and tends to spring back from its displaced and deformed or distorted position and shape to its initial position and shape. In bumpers of the prior art, much of the rubber of the pad is confined, therefore its full effect and advantage as a resilient material are not realized.

SUMMARY OF THE INVENTION

In order to overcome the shortcomings heretofore encountered in bumpers and fenders, therefore, it is a primary object of this invention to provide a bumper pad which makes maximum use of the inherent resilient qualities of its elastomeric components.

Another object of the invention is to provide a bumper having space into which the resilient material may be deformed as a result of force being applied to it.

An additional object of this invention is to provide a bumper having clearance between its resilient pad and its mounting bars, such that movement may take place therebetween for enhanced resilience and resistance to component forces exerted against the bumper.

A further object of the invention is to provide for relative slidable movement between the bumper pad and the mounting surface to which the bumper is attached.

A still further object of this invention is to provide a bumper of optimum resilience by combining with relative slidable movement between the pad and the mounting surface, space into which the elastomeric pad material may be deformed as a result of force being applied to it.

Briefly, the invention resides in a bumper for absorbing shocks between relatively movable and abuttable bodies adapted for mounting on a surface of one of the bodies, and including: a pair of elongated mounting bars adapted to be secured to the one body; an elongated resilient bumper pad of elastomeric material including an integral base and an integral crown wider than the base and superposed on it so as to provide a pair of parallel flange shoulders extending for substantially the entire length of the pad on either side of the base; means for mounting the pair of bars in parallel relationship on the one body so that adjacent sides of the pair of bars and the adjacent portion of the surface of the one body therebetween provide the walls of an elongated channel; and means for securing the pad to the bars with the pair of shoulders in superposition with the pair of bars, and the base received in the channel. The improvement in the invention comprises: the walls of the channel and the base define a space therebetween, the pair of shoulders is free from bond to the pair of bars, and the base is free from bond to the channel, whereby when force is applied to the resilient bumper pad adjacent portions of the base are displaced into the space to absorb the shock of the force applied to the resilient bumper pad, and on release of the force the portions of the base are sprung back to their initial positions by the inherent resilience of the elastomeric material of the pad.

The improvement in the invention may include additionally a reinforcing insert strap in the shoulder and extending for substantially the entire length of the pad so that when the shoulder is in superposition with the bar a layer of elastomeric material is interposed between the strap and the bar, whereby when force is applied to the resilient bumper pad it is distributed along substantially the entire length of the pad and portions of the layer of elastomeric material are displaced to absorb the shock of the force applied to the resilient bumper pad, and on release of the force the portions of the layer are sprung back to their initial positions by the inherent resilience of the elastomeric material of the pad.

BRIEF DESCRIPTION OF THE DRAWINGS

FIG. 1 is a perspective view of an exemplary form of bumper in accordance with the present invention;

FIG. 2 is an elevational view on an enlarged scale of the bumper, partially in section, and a portion of a second bumper in alignment therewith, the bumpers being affixed to a base, such as the bow of a towboat;

FIG. 3 is a bottom view of the bumpers of FIG. 2, partially in section, and on the same scale;

FIG. 4 is a partial sectional view of the bumper, taken on the line 4—4 of FIG. 2, on a still further enlarged scale; and FIG. 5 is a partial sectional view, on the same scale as FIG. 4, of a modified form of the bumper in accordance with the invention.

DESCRIPTION OF THE PREFERRED EMBODIMENTS

Referring to FIG. 1, there is shown a bumper assembly 10 which includes a bumper pad subassembly 20 of elastomeric material, such as rubber or synthetic rubber, the pad 20 having a crown portion 22, a base portion 24, and a pair of flange or shoulder portions 28, each reinforced with a strap 29, preferably of steel embedded therein and bonded to the rubber, and a pair of spaced mounting bars 12, also preferably of steel, to which the pad 20 is bolted by means of bolts 16 passing through the reinforcing straps 29 so that their heads bear against the straps 29 and are recessed in bolt slots 23 in the crown 22, the base 24 of the pad 20 being interposed between the parallel bars 12.

Referring to FIGS. 2, 3 and 4, the parallel bars 12 are shown secured by means of welds 14 to a surface plate 11, which represents the steel bow of a towboat or the like, so as to form an elongated channel portion 18. The bumper 10 is shown mounted in alignment with a second bumper 10', with the base 24 disposed in the channel 18 and resting on the surface plate 11, the longitudinal relief grooves 25 providing for displacement of the elastomeric material of the bumper and the clearance gaps 26 between the base 24 and the bars 12 providing for additional resilient movement and displacement of the elastomeric material of the bumper. The heads of the bolts 16, screwed through the bolt holes 30 of the shoulders 28 into the tapped holes 13 of the bars 12, bear against the reinforcing insert straps 29 of the resilient flanges or shoulders 28 in which the straps 29 are embedded and bonded.

In FIG. 5 is depicted a modified form of the bumper, designated 10a, the parallel bars 12a being secured by means of welds 14a to the surface plate 11 so as to form an elongated channel portion 18a. The pad 20a has resilient flanges or shoulders 28a with reinforcing inserts 29a embedded and bonded therein and through which are passed the bolts 16a screwed into tapped holes 13a of mounting bars 12a; the heads of the bolts 16a are recessed in bolt slots 23a in the crown 22a and bear against the insert straps 29a, the stems of the bolts passing through the bolt holes 30a in the shoulders 28a. The base 24a of the pad 20a is thinner than the bars 12a, thus leaving a clearance space 32 between the base 24a and the surface plate 11 into which the elastomeric material of the pad 20a is free to be displaced; and further deflection may be into the longitudinal grooves 15 of the mounting bars 12a, between which the base 24a fits snugly.

In a typical installation of the bumper assemblies 10 for use as resilient, shock-absorbing fenders on the generally vertical bow 11 of a towboat adapted for pushing barges and the like, the bumper 10 is assembled by bolting to the parallel mounting bars 12, placed in the proper mounting position on the bow plate 11, and the outer edges of the steel mounting bars tack welded to the steel bow surface plate 11. Then to avoid applying excessive heat to the elastomeric bumper pad 20, the latter is removed, and the bars 12 secured to the hull plate 11 by means of welds 14. Following the installation of a number of pairs of mounting bars 12, aligned and in parallel rows, welded to the bow surface plate 11, the bumper pads 20 are bolted to the bars 12 by means of bolts 16 inserted through the flange shoulder holes 30 and screwed into the tapped holes 13. The heads of the bolts 16 are screwed down against the reinforcing insert straps 29 just enough to partially deform and displace the layer of elastomeric material or rubber of the flanges 28, so that the inherent resilience of the rubber provides a biasing force against the top of the mounting bars 12 and the bottom of the insert straps 29, thus resulting in a frictional force in the mating threads of the bolts 16 and the tapped holes 13 as a lock to retain the bolts in place. Thus an inherent self-locking feature is provided for retaining the pad 20 secured to the bars 12; and the reinforcing insert straps 29 serve to spread along the resilient flange portion 28 of the pad 20 the force exerted by the bolts 16 and the forces exerted by the shock of collision and scraping against the bumper 10.

As the towboat is pushing a barge, the wave motion of the water results in a great deal of relative motion between the two. The resilient connections in the shoulders 28 and the clearance gaps 26 between the base portion 24 of the bumper pad 20 and the bars 12 allow for maximum absorption of resultant side forces and glancing and scraping blows against the bumpers 10. As direct forces from pushing and collision take place by contact with the crown portion 22, the complete elastomeric portion of the pad 20 may be deflected and deformed to absorb the forces and cushion the impacts. Elastomeric materials, such as rubber, being practically incompressible, the base portion 24 of the pad 20, if confined within the channel 18 defined by the surface plate 11 and the inner walls of the bars 12, would be almost ineffective in providing elastic resilience to the bumpers 10; so the base 24 is provided with relief grooves 25 and side clearance gaps or spaces 26 into which the rubber may deflect and deform. The complete bumper pad 20, including the crown portion 22, the flange portions 28, and the base portion 24, therefore, is effective as a cushioning device. If the pad 20 becomes worn due to concentrated wear in one area, being symmetrical, it may be reversed end-for-end for additional service. When it becomes worn out and needs replacement, only the bumper pad 20 needs to be replaced, as the mounting bars 12 of the bumper 10 may remain in place permanently. The bumpers of this invention have a minimum of metal-to-metal contact so they are practically free of electrolysis and corrosion, the reinforcing and stabilizing inserts 29 being embedded in and bonded to the elastomeric material, and only the elastomeric material of the base portion 24 and the shoulder portions 28 of the rubber pad 20 being in contact with the mounting bars 12 and also serving as a seal for the threads in the tapped holes 13.

The installation and use of the modified form of the invention, bumper 10a as depicted in FIG. 5, is quite similar and has the same advantages as the bumper 10 described above, except that it provides additional stability in applications where the lateral components of force from side blows are excessive, since the base portion 24a of the pad 20a fits snugly in the channel 18a against the inside faces of the mounting bars 12a, which are secured in parallel rows to the bow plate 11 by welds 14a. Clearance for deflection of the elastomeric material of the base portion 24a resulting from forces exerted against the crown 22a of the bumper 10a is provided by a clearance gap 32 between the pad base 24a and the ship's bow surface plate 11 and by lateral grooves 15 extending along the sides of the bars 12a which are adjacent to the base 24a. Similarly as described above, the bumper pad 20a is screwed onto mounting bars 12a affixed to the bow surface plate 11 by means of bolts 16a screwed through the bolt holes 30a of the flange or shoulder portions 28a into tapped holes 13a, the bolt heads resting on stiffener inserts 29a in recessed bolt slots 23a to provide a resilient bumper assembly.

While the description above refers primarily to the use of the bumpers of this invention as applied to towboats or tugboats, they may be applied with similar advantages in other installations such as on other types of ships for use as ship fenders, on docks and wharves, on trucks, trailers and other similar vehicles, and on truck docks and parking curbs.

Additionally, while two forms of the invention have been shown and described, minor changes could be made without departing from the scope of the claims of this invention. For example the mounting bars 12, 12a need not be welded to the protected surface, but may be of material other than steel, such as wood or plastic, secured by screwing or bolting to the surface. Also, although the bumpers are depicted by illustration as being oriented horizontally on the bow of the towboat, they may be mounted in a vertical orientation, or at other angles as their use requires.

I claim:

1. A bumper for absorbing shocks between relatively movable and abuttable bodies, adapted for mounting on a surface of one of the bodies, and including:
   a. a pair of elongated mounting bars adapted to be secured to said one of the bodies;
   b. an elongated resilient bumper pad of elastomeric material including an integral base and an integral crown wider than the base and superposed thereon so as to provide a pair of parallel flange shoulders extending for substantially the entire length of said pad on either side of said base;
   c. means for mounting said pair of bars in parallel relationship on said one of the bodies so that adjacent sides of said pair of bars and the adjacent portion of the surface of said one of the bodies therebetween provide the walls of an elongated channel; and
   d. means for securing said pad to said bars with said pair of shoulders in superposition with said pair of bars, and said base received in said channel;
   wherein the improvement comprises
   the walls of said channel and said base define a space therebetween; said pair of shoulders is free from bond to said pair of bars and said base is free from bond to said channel, whereby when force is applied to said resilient bumper pad adjacent portions of said base are displaced into said space to absorb the shock of the force applied to said resilient bumper pad, and on release of said force said portions of said base are sprung back to their initial positions by the inherent resilience of the elastomeric material of said pad.

2. A bumper as defined in claim 1 wherein: said base and said shoulders are slidable relative to said mounting bars so as to allow for deformation and movement of said resilient bumper pad of elastomeric material when force is applied to said pad and for return to its initial form by said inherent resilience of the elastomeric material.

3. A bumper as defined in claim 1 wherein: said space between the walls of said channel and said base comprises gaps between said base and said pair of mounting bars extending for substantially the entire length of said base, and said base has a groove facing the adjacent portion of said one of the bodies and extending for substantially the entire length of said base.

4. A bumper as defined in claim 1 wherein: said space between the walls of said channel and said base comprises grooves in said mounting bars and extending for substantially the entire length of said base, and a gap between said base and said adjacent portion of the surface of said one of the bodies extending for substantially the entire length of said base.

5. A bumper as defined in claim 1 including: an elongated reinforcing insert strap embedded in each of said pair of shoulders and extending for substantially the entire length of said shoulders so that when force is applied to said bumper pad the force is distributed throughout substantially the entire length of said bumper pad.

6. A bumper as defined in claim 1 wherein: said space has a volume of from about 5 to about 50 percent of the volume of said channel.

7. A bumper for absorbing shocks between relatively movable and abuttable bodies, adapted for mounting on a surface of one of the bodies, and including:
  a. a pair of elongated mounting bars adapted to be secured to said one of the bodies;
  b. an elongated resilient bumper pad of elastomeric material including an integral base and an integral crown wider than the base and superposed thereon so as to provide a pair of parallel flange shoulders extending for substantially the entire length of said pad on either side of said base;
  c. means for mounting said pair of bars in parallel relationship on said one of the bodies so that adjacent sides of said pair of bars and the adjacent portion of said one of the bodies therebetween provide the walls of an elongated channel; and
  d. means for securing said pad to said bars with said base received in said channel and said pair of shoulders in superposition with said pair of bars;

wherein the improvement comprises
said base being in juxtaposition with said pair of bars; a pair of reinforcing insert straps in said pair of shoulders and extending for substantially the entire length of said pad in superposition with said pair of bars; and a layer of elastomeric material interposed between said pair of straps and said pair of bars.

8. A bumper for absorbing shocks between relatively movable and abuttable bodies, adapted for mounting on a surface of one of the bodies, and including:
  a. a pair of elongated mounting bars adapted to be secured to said one of the bodies;
  b. an elongated resilient bumper pad of elastomeric material including an integral base and an integral crown wider than the base and superposed thereon so as to provide a pair of parallel flange shoulders extending for substantially the entire length of said pad on either side of said base;
  c. means for mounting said pair of bars in parallel relationship on said one of the bodies so that adjacent sides of said pair of bars and the adjacent portion of the surface of said one of the bodies therebetween provide the walls of an elongated channel; and
  d. means for securing said pad to said bars with said pair of shoulders in superposition with said pair of bars, and said base received in said channel;

wherein the improvement comprises
said base being in juxtaposition with said pair of bars; a reinforcing insert strap in each of said shoulders and extending for substantially the entire length of said pad in superposition with said pair of bars; and a layer of elastomeric material interposed between said straps and said pair of bars,
the walls of said channel and said base define a space therebetween; said pair of shoulders is free from bond to said pair of bars and said base is free from bond to said channel, and whereby when force is applied to said resilient bumper pad, portions of said layer of elastomeric material are displaced from between said straps and said bars and adjacent portions of said base are displaced into said space to absorb the shock of the force applied to said resilient bumper pad, and on release of said force said portions of the layer and said portions of the base are sprung back to their initial positions by the inherent resilience of the elastomeric material.